March 14, 1950     W. J. O'BRIEN     2,500,200
MULTIPLE CHANNEL RADIO FREQUENCY RECEIVER
Filed Aug. 27, 1945     2 Sheets-Sheet 1

INVENTOR.
WILLIAM J. O'BRIEN,
BY
ATTORNEY.

March 14, 1950     W. J. O'BRIEN     2,500,200
MULTIPLE CHANNEL RADIO FREQUENCY RECEIVER
Filed Aug. 27, 1945     2 Sheets-Sheet 2
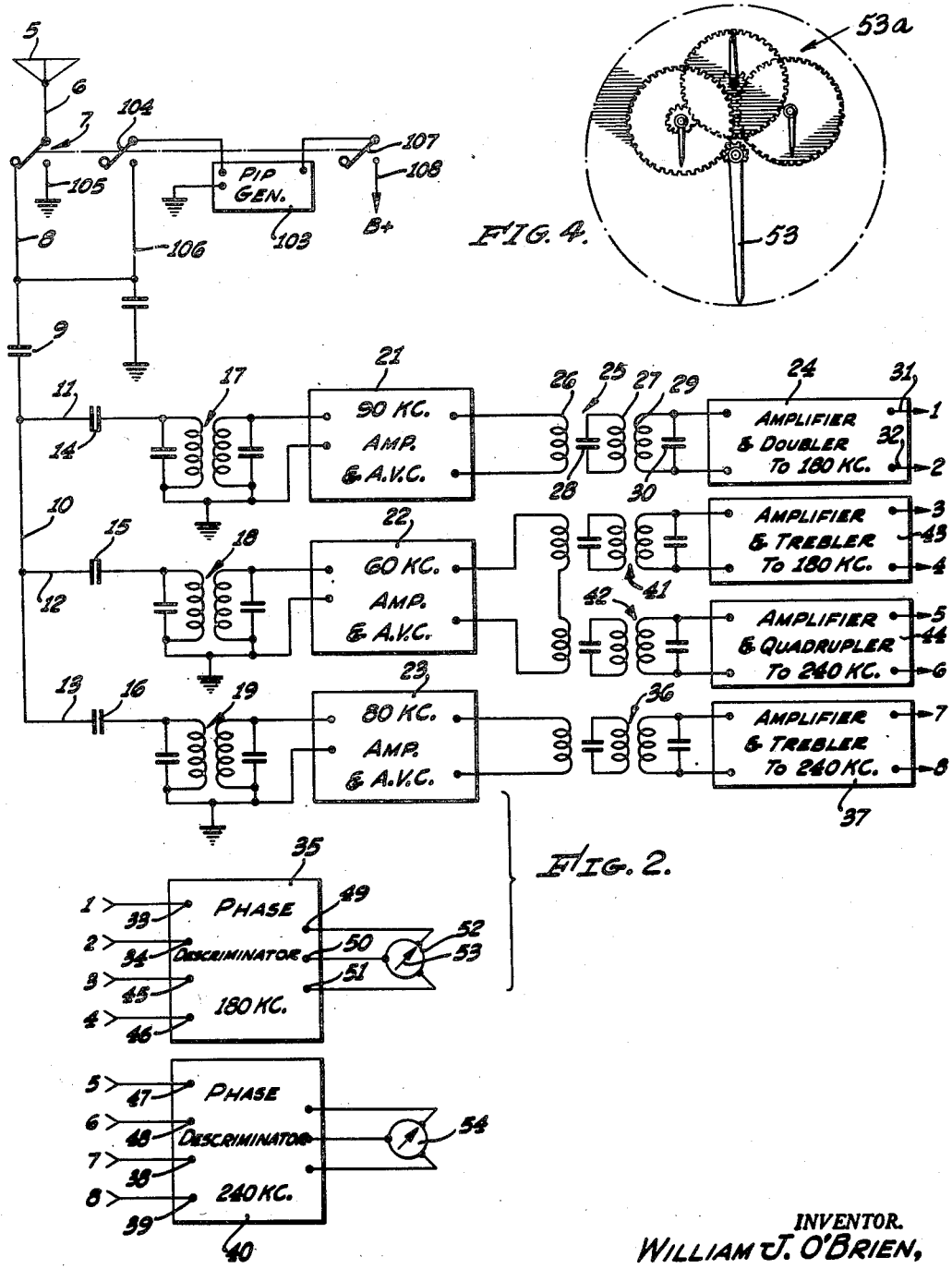
INVENTOR.
WILLIAM J. O'BRIEN,
BY
ATTORNEY.

Patented Mar. 14, 1950

2,500,200

UNITED STATES PATENT OFFICE 2,500,200

MULTIPLE CHANNEL RADIO-FREQUENCY RECEIVER

William J. O'Brien, London, England, assignor to The Decca Record Company, Limited, London, England, a corporation of Great Britain Application August 27, 1945, Serial No. 612,991

2 Claims. (Cl. 343—105)

My invention relates to a radio frequency receiving apparatus and has particular reference to a three-channel receiver, together with phase displacement indicators for indicating the phase relationships between synchronized radio frequency transmissions from spaced antennae and at unlike but related frequencies.

As is disclosed in my copending application Serial No. 612,987, filed August 27, 1945, now abandoned and entitled Navigation system, it is possible by means of synchronized radio frequency transmissions from spaced points and at unlike but related frequencies to establish superimposed and intersecting lines of equal phase displacement, thus defining a coordinate system which may be used for guiding the navigation of vehicles of various types. The utility of such a system depends, of course, upon equipping the vehicle with reception apparatus suitable for receiving the three synchronized transmissions and for indicating the relative phase relationships between these transmissions in terms of the coordinate system developed by the overlapping and interacting radio frequency fields. Such an apparatus must include the necessary instrumentalities for simultaneously receiving the three signals, for making a phase analysis and comparison of the signals, and indicating on a suitable instrument the result of the analysis and comparison in terms of the established coordinate system. This must be accomplished without the introduction of spurious phase shifts which would produce an erroneous indication, and the apparatus must also be capable of accommodating a very wide range of signal strengths.

It is, therefore, an object of the present invention to provide a radio frequency receiving apparatus which includes means for receiving simultaneously three separate but related radio transmissions, together with means for analyzing, comparing and indicating the phase relationships existing between the respective transmissions.

It is an additional object of my invention to provide an apparatus of the character set forth in the preceding paragraph in which the phase relationship indication is given continuously.

It is also an object of my invention to provide an apparatus of the character described which includes an automatic volume control mechanism for each channel for maintaining an adequate outlet level and without introducing spurious phase shifts.

It is a still further object of my invention to provide an apparatus of the character described in the preceding paragraphs which includes an antenna coupler for connecting the input to each of the receiver channels to a single receiving antenna so that changes in antenna capacity characteristics resulting from random use of antennae will not impair the operation of the apparatus.

It is additionally an object of my invention to include in an apparatus of the character set forth hereinbefore a mechanism permitting the adjustment of the receiver and the accuracy of the indication to be checked or corrected at any time.

Other objects and advantages of my invention will be apparent from a study of the following specifications, read in connection with the accompanying drawing, wherein:

Fig. 2 is a schematic diagram illustrating the construction of the receiving apparatus;

Fig. 4 is a diagrammatic view illustrating a type of registering mechanism which may be connected to the phase indicators.

Figure 1:
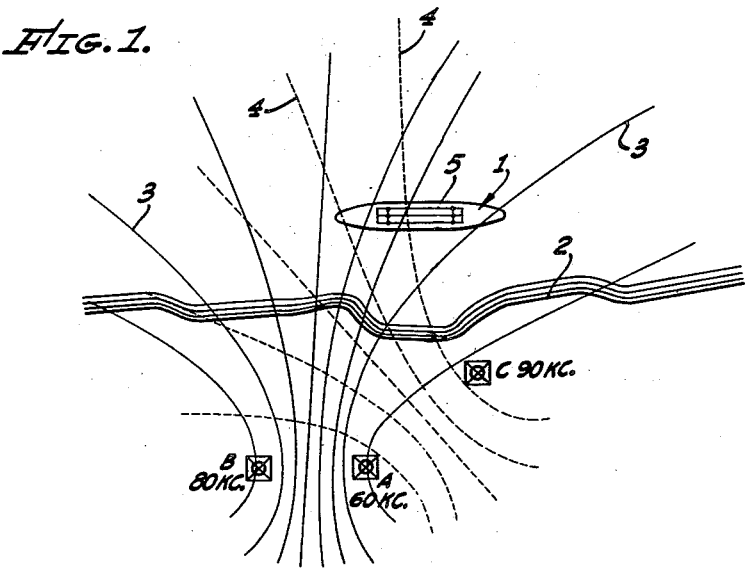
Fig. 1 is a schematic drawing representing the elements of a radio frequency navigation system of the character disclosed in my aforementioned copending application with which the radio reception apparatus to be described hereinafter is particularly adapted for use.

Referring to the drawings, I have illustrated in Fig. 1 a radio frequency navigation system of a type with which the radio receiving apparatus may be used. As is described in my aforementioned copending application, the transmission apparatus may include three radio frequency transmitters A, B and C. In the event the apparatus is to be used for guiding the navigation of sea-going vessels, such as is represented in Fig. 1 by the outline 1, the transmitters A, B and C may be placed at or near the shoreline 2. They are spaced from each other at predetermined distances and are synchronously operated at unlike but related frequencies as, for example, 60, 80 and 90 kilocycles, respectively.

With this mode of operation, the radio frequency fields produced by transmitters A and B interact to establish a field pattern such as that represented by the solid lines 3 in Fig. 1, each of which lines represents the locus of the equal phase displacement between the signals emanating from the transmitters A and B and referred to a frequency which is the least common multiple of the frequencies at which the transmitters are operated as, for example, a frequency of 240 kilocycles. Similarly, the interaction of the fields produced by the transmitters A and C may be characterized by lines 4 of equal phase displacement as referred to a frequency equal to the least common multiple of the two transmission frequencies; in the example assumed, 180 kilocycles.

The present invention is directed to radio frequency receiving apparatus which is installed on the vessel 1 and connected to a suitable antenna 5 mounted thereon which operates indicating mechanisms for indicating the phase relationships between the A and B transmissions and the phase relationships between the A and C transmissions to thereby provide an indication of the geographical location of the vessel 1 in terms of the coordinate system represented by the equal phase displacement lines 3 and 4.

The receiving apparatus is illustrated diagrammatically in Fig. 2 and may include a lead-in 6 connected to the antenna 5 and terminating at one pole of a three pole double-throw switch 7, the purpose of which will be described hereinafter. In the position shown, the switch 7 connects the lead-in 6 to a conductor 8 which is coupled through a condenser 9 to a feeder conductor 10. From the feeder conductor 10 branch circuits 11, 12 and 13 are connected, respectively, through coupling condensers 14, 15 and 16 to double tuned input transformers 17, 18 and 19, each of the transformers consisting of inductively coupled primary and secondary windings each shunted by a suitable tuning condenser. The low voltage ends of each of the windings are interconnected and returned to ground.

The transformer 18 is tuned to the frequency of the transmissions from station A (in the assumed example, it is tuned to 60 kilocycles). The transformers 17 and 19 are, respectively, tuned to the transmissions of stations C and B (90 and 80 kilocycles). Phase changes by the transformers 17-19 may be made equivalent and therefore of no effect by making equal all the tuning capacities and relative degrees of coupling, and by making the respective Q's proportional to the frequency. This results in a phase change versus capacity change relationship that is proportional to frequency. The secondaries of the transformers 17, 18 and 19 are coupled, respectively, to the input terminals of radio frequency amplifiers 21, 22 and 23 tuned also to the frequencies of 90, 60 and 80 kilocycles. Also in order that an adequate and reasonably constant output level may be realized, the amplifiers are provided with identical automatic volume control circuits. These circuits may be of conventional construction, although automatic volume control circuits of the character disclosed in my copending application Serial No. 612,992, filed August 27, 1945, and entitled "Automatic volume control circuits," are preferred.

The amplifier 21 is coupled to an amplifier and frequency doubler 24 through a coupling unit 25. The coupling unit 25 comprises an exciter winding 26 which is connected directly across the output of the amplifier 21. The exciter winding 26 is inductively coupled to a transformer primary winding 27 which is tuned to 90 kilocycles by a tuning condenser 28. The primary winding 27 is inductively coupled to a secondary winding 29 which is likewise tuned to 90 kilocycles by a tuning condenser 30 and which is connected across the input terminals of the amplifier and doubler 24.

Low "Q" coils are used in all the tuned circuits and a coupling of the order of magnitude of 70% is employed. By so doing a straight line phase versus frequency response is obtained, and the characteristic is substantially independent of temperature effects on the resistivity of the copper wire.

The operation of the amplifier and doubler is to produce across its output terminals a 180 kilocycle output signal. This signal is conveyed by conductors 31 and 32 to two input terminals 33 and 34 of a 180 kilocycle phase discriminator 35.

In a manner similar to that just described, the output of the amplifier 23 is coupled through a coupling unit 36 to an amplifier and frequency trebler 37 which produces across its output terminals a 240 kilocycle output signal. This output signal is in turn connected across input terminals 38 and 39 of a 240 kilocycle phase discriminator 40. The output of the 60 kilocycle amplifier 22 is connected to two coupling units 41 and 42 through the expedient of connecting the exciting coils thereof in series and across the output of the amplifier 22. The coupling unit 41 applies the 60 kilocycle output signal of the amplifier 22 to the input of an amplifier and frequency trebler 43, while the coupling unit 42 applies an equivalent signal to the input of an amplifier and frequency quadrupler 44.

The amplifier and trebler 43 produces a 180 kilocycle output signal which is connected to input terminals 45 and 46 of the 180 kilocycle phase discriminator 35. The amplifier and quadrupler 44 produces a 240 kilocycle output signal which is connected to input terminals 47 and 48 of the 240 kilocycle phase discriminator 40. The frequency trebling and quadrupling which is effected by the units 37, 43 and 44 may be accomplished in a conventional manner.

Figure 3:
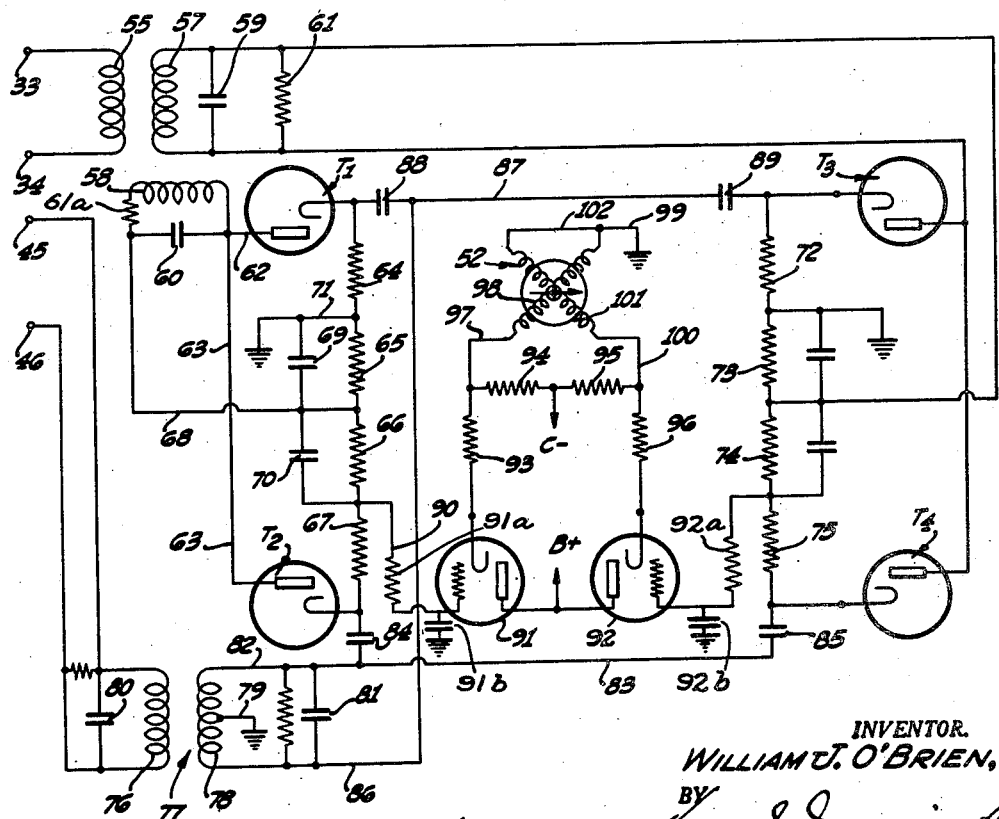
Fig. 3 is a wiring diagram illustrating in detail the components and electrical connections employed in the phase discriminator portion of the apparatus illustrated in Fig. 2.

The phase discriminators 35 and 40 are constructed as disclosed in Fig. 3. The phase discriminator 35 compares the signal applied across the input terminals 33—34 with that applied across the input terminals 45 and 46 and produces across output terminals 49 and 50 and across output terminals 50 and 51 direct potentials, the relative magnitudes of which are representative of the phase relationships between the 180 kilocycle signal impressed across input terminals 33 and 34 and that impressed across input terminals 45 and 46.

The direct potential output of the phase discriminator is connected to a two coil goniometer 52 which is preferably of the registering type such as that disclosed in my copending application Serial No. 612,984, filed August 27, 1945, and entitled "Registering goniometer," and which is adapted to indicate as by a suitable pointer 53 the instantaneous phase relationship. An associated registering mechanism 53a (Fig. 4) connected by suitable gearing to the pointer 53 serves to indicate the accumulative total of phase changes occurring during the time the device is in operation. Assuming, therefore, that the registering mechanism of the indicating instrument 52 was initially set to indicate a coordinate location equivalent to the geographical location of the vessel 1, the instrument will continuously operate to indicate the instantaneous location of the vessel 1 with respect to the equi-phase grid represented by the dotted lines 4. A similar instrument 54 is connected to the output of the phase discriminator 40 to indicate the position of the vessel 1 with respect to the equi-phase grid 3. Together the indicators 52 and 54 continuously indicate the location of the vessel 1.

The phase discriminators 35 and 40 are identical except that the tuned circuits employed in the discriminator 35 are tuned to 180 kilocycles, whereas those employed in the discriminator 40 are tuned to 240 kilocycles.

The input terminals 33 and 34 are connected to a transformer primary winding 55, which is closely coupled to a secondary winding 57 tuned by a tuning condenser 59. Another secondary winding 58 is loosely coupled to the secondary winding 57. The winding 57 is loaded by a shunt resistance 61, whereas the winding 58 is connected through a series resistance 61a to a tuning condenser 60. The inductance of the winding 58 is made slightly greater than that of the winding 57, and the coupling is adjusted to produce equal voltage outputs across the condensers 59 and 60 respectively, and are also so adjusted as to produce a phase difference between these voltages of precisely 90°. The condensers 59 and 60 are chosen to tune the two windings to the same frequency as that applied across terminals 33 and 34. The loading resistances 61 and 61a are employed to reduce the Q of the tuned circuits to improve the frequency shift tolerance of the circuits.

One terminal of the condenser 60 is connected as by means of conductors 62 and 63 to the plates or anodes of thermionic rectifier tubes $T_1$ and $T_2$. The cathodes of these two tubes are interconnected by four series connected resistors 64, 65, 66 and 67, the mid point between resistances 65 and 66 being connected through conductor 68 to the other terminal of the condenser 60.

The resistances 65 and 66 are preferably by-passed by condensers 69 and 70 and the mid point between resistances 64 and 65 is grounded as by a conductor 71. Thermionic rectifier tubes $T_3$ and $T_4$ with cathode resistances 72, 73, 74 and 75 are connected across the transformer winding 57 in a manner identical to the circuits associated with the winding 58. Input terminals 45 and 46 are connected across a primary winding 76 of an input transformer 77 inductively coupled to a secondary winding 78 thereof.

The winding 78 is preferably provided with a center tap which is connected to ground as by a conductor 79 and the windings 76 and 78 are tuned to the input frequency as by tuning condensers 80 and 81. The windings 76 and 78 are loaded respectively by shunt connected resistances 76a and 78a, these resistors being employed for the purpose of reducing the Q of the tuned circuits. The secondary winding 78 is so constructed as to provide a voltage across these terminals equal to that appearing across the terminals of the secondary winding 57. One terminal of the winding 78 is connected through conductors 82, 83 and coupling condensers 84 and 85 to the cathodes of the rectifier tubes $T_2$ and $T_4$. The other terminal of the winding 78 is connected through conductors 86 and 87 and coupling condensers 88 and 89 to the cathodes of the tubes $T_1$ and $T_3$.

The mid point between resistances 66 and 67 is connected by a conductor 90 to the grid of an amplifier tube 91 and a similar connection interconnects the grid of an amplifier tube 92 to the mid point between resistances 74 and 75. These grid leads includes series resistances 91a and 92a which, together with grid to ground condensers 91b and 92b, serve to filter out noise and other extraneous signals to prevent the fluttering of the needle of the goniometer 52 which is driven by the tubes 91 and 92. The anodes of the tubes 91 and 92 are interconnected and connected to a suitable source of plate supply potential represented by the arrow bearing the legend B+ in Fig. 3. The cathodes of the tubes 91 and 92 are interconnected by a series circuit including resistances 93, 94, 95 and 96, the mid point between resistances 94 and 95 being connected to a suitable source of direct potential having a negative polarity with respect to ground and indicated generally by the arrow bearing the legend C− in Fig. 3.

The mid point between resistances 93 and 94 is connected through a conductor 97 to one terminal of one coil 98 of the goniometer 52, the other terminal of said coil being connected to ground by a conductor 9. Similarly, the mid point between resistances 95 and 96 is connected by a conductor 100 to one terminal of the other coil 101 of the goniometer 52, the other terminal of said coil being connected to ground through a conductor 102.

In the phase discriminator circuit just described, the voltage which is applied across the tube $T_1$ is the vector sum of the voltage across the winding 58 and the voltage on conductor 86. The voltage applied to the tube $T_2$ is the vector sum of the voltage developed across the winding 58 and the voltage on conductor 82. In a like manner, the voltage across the tube $T_3$ is the vector sum of the voltage developed across the winding 57 and that appearing on conductor 86, while the voltage across the tube $T_4$ is the vector sum of that appearing across the winding 57 and the voltage on conductor 82.

The voltages developed across the windings 57 and 58 constitute one system of a fixed phase quadrature relationship, whereas the voltages on conductors 82 and 86 comprise an independent system in which the voltages are in fixed opposition to each other. The phase angle between these two systems is variable and equal to the phase angle of the input applied to the terminals 33—34 with respect to that applied to the terminals 45—46. Each of the voltages across the four tubes $T_1$-$T_4$ is therefore variable as the input phase relationship varies.

The direct current flowing through the resistances 64—65, 66—67, 72—73 and 74—75 are in direct proportion to the voltages applied across the four tubes and therefore represent by their magnitude the phase relationship between the incoming signals. A portion of each of these voltages is applied to the grids of the amplifier tubes 91 and 92 so that the current flowing in the cathode circuits of these tubes and therefore through the goniometer coils 98 and 101 are in a ratio substantially equal to the tangent of the phase angle between the input signals.

The goniometer coils 98 and 101 are disposed at right angles to each other in the goniometer. The magnetic flux produced by the inter-action of these coils has a direction which is determined by the vector sum of the two coil currents disposed at right angles to each other. The direction of the resultant field is therefore representative of the phase angle between the input signals. The indicator 53 forming a part of the goniometer 52 is attached to a permanent magnet mounted for rotation in the resultant magnetic field and the pointer, therefore, assumes a position representing the phase relationship between the input signals.

Initial adjustment of the apparatus is provided for in the apparatus of my invention. The mechanism employed is illustrated diagrammatically in Fig. 2 as comprising a "pip" generator 103, the output of which is connected between ground and the moving contact 104 of the three-pole, double-throw switch 7. The switch 7 is arranged to, in one position (that shown in Fig. 2), connect the antenna lead-in 6 to the conductor 8 and to isolate the "pip" generator 103. In the alternate position the antenna lead-in 6 is connected to ground through conductor 105. The output of the "pip" generator is connected through switch blade 104 to the input conductor 8 through a conductor 106 and plate supply is applied to the "pip" generator by the third switch pole 107 and plate supply conductor 108.

The "pip" generator 103 preferably constitutes a signal generator of the character disclosed in my copending application Serial No. 612,988, filed August 27, 1945, and entitled "Signal generator," although substantially any form of signal generator having the desired output characteristics may be used. The "pip" generator described in the above-identified application delivers an output signal consisting of a series of single impulses or "pips" at a frequency of say 10 kilocycles and each having a duration of a few micro seconds. The feature of this type of output signal which is employed in the instant apparatus is that a signal of this character includes not only the 10 kilocycle fundamental, but an infinite series of both odd and even harmonics thereof. Furthermore, the multiple phase relationship between any two harmonics is the same as that existing between any other two harmonics. Thus when the switch 7 is thrown to the test position to place the "pip" generator in operation, the amplifier 21 amplifies the 90 kilocycle harmonic of the "pip" generator output, while the amplifier 22 amplifies the 60 kilocycle harmonic and the amplifier 23 passes the 80 kilocycle harmonic.

Since the multiple phase relation between the 90 and 60 kilocycle harmonics is the same as that existing between the 60 and 80 kilocycle harmonics, the phase discriminators 52 and 54 will give identical readings if the apparatus is in proper adjustment. Preferably, during the manufacture and final testing of the apparatus the circuit constants are so adjusted as to give zero readings on the goniometers when the apparatus is excited from the "pip" generator 103 as described. This provides a logical and easily remembered check reading to be used in subsequent checks on the operation of the apparatus. At the completion of a check, the apparatus is placed in normal operation by the simple expedient of throwing the switch 7 to the alternate position.

From the foregoing it will be seen that I have provided a novel three channel radio frequency receiving apparatus, together with phase discriminators and phase displacement indicators for indicating the phase relationships between synchronized radio frequency transmissions from spaced antennae and at unlike but related frequencies.

Attention is directed particularly to the use of the doublers, treblers and quadruplers for bringing the 90 and 60 kilocycle signals on the one hand and the 60 and 80 kilocycle signals on the other hand to a frequency comprising the least common multiple of the received frequencies to permit a phase comparison to be made.

It will also be noted that it is the phase discriminator circuit which is shown in Fig. 3 that provides for a continuous and accurate indication of the relative phase relationships between the received signals.

While I have shown and described the preferred embodiment of my invention, I do not desire to be limited to any of the details of construction shown and described herein, except as defined in the appended claims.

I claim:

1. In a radio frequency receiving apparatus for determining the multiple phase relationships among three radio frequency transmissions of unlike related frequencies, the combination of: three radio frequency amplifiers each tuned to a different one of said transmission frequencies; a pair of frequency multipliers connected, respectively, to the outputs of two of said amplifiers and each having a frequency multiplication ratio equal to a different one of the unique factors of the frequencies to which said two amplifiers are tuned, whereby the frequencies of the outputs of said frequency multipliers are each equal to the least common multiple of said two transmission frequencies; a second pair of frequency multipliers connected, respectively, to the outputs of a different two of said amplifiers and each having a frequency multiplication ratio equal to a different one of the unique factors of the frequencies to which said latter two amplifiers are tuned, whereby the frequencies of the outputs of said second pair of frequency multipliers are equal to the least common multiple of said latter two transmission frequencies; and a pair of phase angle indicators each interconnected with the outputs of a different pair of said frequency multipliers.

2. In a radio frequency receiving apparatus for determining the multiple phase relationships among three radio frequency transmissions of unlike related frequencies, the combination of: three radio frequency amplifiers each tuned to a different one of said transmission frequencies; a pair of frequency multipliers connected, respectively, to the outputs of two of said amplifiers and each having a frequency multiplication ratio equal to a different one of the unique factors of the frequencies to which said two amplifiers are tuned, whereby the frequencies of the outputs of said frequency multipliers are each equal to the least common multiple of said two transmission frequencies; a second pair of frequency multipliers connected, respectively, to the outputs of a different two of said amplifiers and each having a frequency multiplication ratio equal to a different one of the unique factors of the frequencies to which said latter two amplifiers are tuned, whereby the frequencies of the outputs of said second pair of frequency multipliers are equal to the least common multiple of said latter two transmission frequencies; a pair of phase discriminators each connected with the outputs of a different pair of said frequency multipliers for producing a pair of direct potentials, the relative magnitudes of which are representative of two right angle components of the phase angle between the outputs of the respective frequency multipliers; and a phase angle indicator for each of said discriminators.

WILLIAM J. O'BRIEN.

REFERENCES CITED

The following references are of record in the file of this patent:

UNITED STATES PATENTS

| Number | Name | Date |
|---|---|---|
| 1,957,519 | Aiken | May 8, 1934 |
| 2,144,203 | Shanklin | Jan. 17, 1939 |
| 2,151,081 | Carlson | Mar. 21, 1939 |
| 2,198,113 | Holmes | Apr. 23, 1940 |
| 2,318,248 | Minton | May 4, 1943 |
| 2,335,265 | Dodington | Nov. 30, 1943 |
| 2,408,773 | Goodall | Oct. 8, 1946 |

FOREIGN PATENTS

| Number | Country | Date |
|---|---|---|
| 546,000 | Germany | Mar. 8, 1932 |